United States Patent
Rey et al.

(10) Patent No.: US 7,023,941 B1
(45) Date of Patent: Apr. 4, 2006

(54) JOINT EQUALIZATION AND TIMING ACQUISITION FOR RZ SIGNALS

(75) Inventors: Claudio Gustavo Rey, Stittsville (CA); Jonathan Robert Gay, Vancouver (CA); William Michael Lye, Coquitlam (CA); Ognjen Katic, Vancouver (CA); Terence K. W. Lau, Coquitlam (CA); Jatinder Singh Chana, Burnaby (CA)

(73) Assignee: PMC-Sierra, Inc., Santa Clara, CA (US)

( * ) Notice: Subject to any disclaimer, the term of this patent is extended or adjusted under 35 U.S.C. 154(b) by 591 days.

(21) Appl. No.: 10/384,585

(22) Filed: Mar. 11, 2003

(51) Int. Cl.
H04L 7/00 (2006.01)

(52) U.S. Cl. ............... 375/355; 375/233; 375/232; 375/376; 375/375

(58) Field of Classification Search ............ 375/230, 375/232, 233, 355, 376, 316, 375, 373
See application file for complete search history.

(56) References Cited

U.S. PATENT DOCUMENTS

| | | | |
|---|---|---|---|
| 4,004,226 A | 1/1977 | Qureshi et al. | |
| 4,334,313 A | 6/1982 | Gitlin et al. | |
| 4,411,000 A | 10/1983 | Kustka | |
| 4,815,103 A * | 3/1989 | Cupo et al. | 375/234 |
| 5,031,197 A | 7/1991 | Hespelt et al. | |
| 5,581,585 A * | 12/1996 | Takatori et al. | 375/376 |
| 5,825,818 A | 10/1998 | Kaku et al. | |
| 5,862,191 A | 1/1999 | Moridi | |
| 6,803,966 B1 * | 10/2004 | Hong | 348/500 |
| 2003/0021370 A1 * | 1/2003 | Menkhoff | 375/355 |

FOREIGN PATENT DOCUMENTS

EP 0 599 311 B1 1/1994

OTHER PUBLICATIONS

Proakis, J. G., Digital Communications, 3$^{rd}$ Edition, McGraw-Hill, 1995.

Goldberg, B., Digital Frequency Synthesis Demystified, LLH Technology Publishing, Eagle Rock, Virginia, 1999.

Razavi, Behzad, Design of Monolithic Phase-Locked Loops and Clock Recovery Circuits—A Tutorial. Monolithic Phase-Locked Loops and Clock Recovery Circuits. Ed. Behzad Razavi. IEEE Press, New York, 1996. 1-39.

Near-optimal PLL design for decision-feedback carrier and timing recovery, Yaniv, O.; Raphaeli, D., Communications, IEEE Transactions on, vol.: 49 Issue: 9, Sep. 2001, pp. 1669-1678.

Use of adaptive filter for timing recovery for data storage channels, Yifei Yuan; Kumar, B.V.K.V., Communications, 2000. ICC 2000. 2000 IEEE International Conference on, vol.: 1, 2000, pp. 94-98 vol. 1.

(Continued)

*Primary Examiner*—Phuong Phu
(74) *Attorney, Agent, or Firm*—Oyen Wiggs Green & Mutala

(57) ABSTRACT

An apparatus and method for jointly equalizing a return to zero (RZ) signal and detecting timing errors in the RZ signal, using values or indices from equalizer taps, including a set reference tap that does not shift. A timing error detector detects a timing error based on a group delay measured from the equalizer tap information, and then adjustment circuitry modifies samples of the received RZ signal prior to their equalization to offset that timing error. Methods of modifying the samples to offset the timing error include adjusting the timing of the sampler, or adjusting the sampled data using intermediate, interpolated samples generated by a timing interpolation filter.

24 Claims, 6 Drawing Sheets

OTHER PUBLICATIONS

Symbol synchronization using signal samples and interpolation, Armstrong, J.; Strickland, D., Communications, IEEE Transactions on, vol.: 41 Issue: 2, Feb. 1993, pp. 318-321.

Blind algorithms for joint clock recovery and baseband combining in digital radio, Guglielmi, F.; Luschi, C.; Spalvieri, A., Radio Relay Systems, 1993., Fourth European Conference on, 1993, pp. 279-286.

Timing recovery for adaptive decision feedback equalization of the magnetic storage channel, Abbott, W.L.; Cioffi, J.M., Global Telecommunications Conference, 1990, and Exhibition. 'Communications: Connecting the Future', GLOBECOM '90., IEEE, 1990, pp.: 1794-1799 vol. 3.

* cited by examiner

JOINT EQUALIZATION AND TIMING ACQUISITION FOR RZ SIGNALS

TECHNICAL FIELD

This invention relates generally to data communications. More particularly, this invention relates to timing acquisition/tracking and equalization of return to zero (RZ) signals.

BACKGROUND

A variety of physical impairments limit the effective transmission of data signals over wireline and wireless channels, such as the frequency selective nature of the channels, which causes different frequency components of the input signal to be attenuated and phase-shifted differently. This causes the impulse response to span several symbol intervals, resulting in time-smearing and interference between successive transmitted input symbols, commonly known as intersymbol interference (ISI). The ISI resulting from the channel distortion, if left uncompensated, causes high error rates. The solution to the ISI problem is to design a receiver that employs a means for compensating or reducing the ISI in the received signal. The compensator for the ISI is called an equalizer.

There are two general classes of equalization techniques to mitigate ISI:

(a) Maximum likelihood sequence estimation (MLSE), where a dynamic programming algorithm is used to determine the most likely transmitted sequence, given observations of the received noisy and ISI-corrupted sequence and knowledge of the channel impulse response coefficients; and (b) Sub-optimal equalizer structures like a linear equalizer (LE), where one simple finite impulse response (FIR) filter is used to mitigate ISI, or a non-linear decision feedback equalizer (DFE) that in addition to the feed-forward FIR filter, employs a feedback filter (FBF) on the previously detected symbols.

MLSE uses a sequence of received signal samples over successive symbol intervals to make decisions about the transmitted symbols, and is optimal from a bit error rate (BER) perspective. However, MLSE has a computation complexity that grow exponentially with the length of the channel time dispersion, and in most channels of practical interest, such a large computational complexity is prohibitively expensive to implement. In sub-optimal structures like LE and DFE, data detection is done on a symbol-by-symbol basis and hence is much simpler to implement than the optimal MLSE. Linear equalization uses a linear filter with adjustable coefficients. Decision feedback equalization exploits the use of previous detected symbols to suppress the ISI in the present symbol being detected.

In a typical baseband digital transmission over wireline, such as a DS3/E3/STS-1 line, the signal is distorted and attenuated due to the channel characteristics, cross talk, noise and timing jitter. Traditionally, as illustrated in FIG. 1, an analog equalizer is used at the receiver to compensate for intersymbol interference (ISI) due to the channel, and an analog timing recovery unit is used to acquire the optimal instant for sampling the received signal. This recovered timing signal is then used by digital signal processing circuitry. Referring to FIG. 1, a prior art receiver 10 uses an analog equalizer 12 and a digital timing recovery circuit comprising an analog-to-digital converter (ADC) 14, a detector 15, a timing error detector (TED) 16, a filter 17, and a voltage controlled oscillator (VCO) 18. Although the timing recovery circuit in FIG. 1 is digital overall, the VCO 18 portion is actually an analog circuit.

Techniques such as this decouple timing from equalization. The analog equalizer 12 illustrated in FIG. 1 does not require any timing information. In this way, it is able to decouple itself from timing acquisition. Unfortunately, the technique is slow to converge and will not yield as good a performance as that achieved by a straightforward linear symbol spaced equalizer (with ideal timing). Moreover, the technique depends on a power hungry analog equalizer circuit.

Other typical techniques of mitigating ISI are digital and use a symbol or partial-spaced equalization and may use a non-linear blind timing algorithm that precedes the equalizer or one that uses decision feedback. Such techniques are described in Proakis, J. G., *Digital Communications*, 3rd Edition, McGraw-Hill, 1995, pp. 358–365; and Razavi, Behzad, "Design of Monolithic Phase-Locked Loops and Clock Recovery Circuits—A Tutorial", *Monolithic Phase-Locked Loops and Clock Recovery Circuits*, Ed. Behzad Razavi, IEEE Press, New York, 1996, 1–39. Methods that are based on the equalizer decision cannot handle input frequency offsets; as the equalizer tracks the frequency offset, the main tap slowly moves from one tap location to the next, eventually causing equalization failure. On the other hand, prior art techniques that use a blind, non-decision-based timing recovery are not very robust in the presence of high frequency input jitter.

Non-decision-based linear equalization uses a linear filter with adjustable coefficients; as those coefficients are adjusted through the equalization process, the distribution of the coefficients at any symbol interval can be used in timing recovery techniques. For example, U.S. Pat. No. 4,004,226 to Qureshi et al. discloses an automatic adaptive equalizer having taps spaced equally apart, tap coefficient circuitry for repeatedly multiplying the output of each tap by a respective tap coefficient, and adjustment circuitry for adjusting the tap coefficients to effect equalization, followed by output circuitry responsive to the equalizer for providing output signals at specific times. During each symbol interval, an algorithm identifies the largest magnitude coefficient. If the largest magnitude coefficient is determined to be the center coefficient (although it is not necessary to be precisely in the center of the coefficient queue), no timing adjustment is made. When the largest magnitude coefficient is not in the center, the receiver timing is advanced if the largest coefficient is in the back of the queue or retarded if the largest coefficient is in the front of the queue. The timing recovery circuitry comprises means for keeping the principal tap coefficient within a predetermined number of taps from the center of the equalizer.

U.S. Pat. No. 4,334,313 to Gitlin et al. and U.S. Pat. No. 4,411,000 to Kustka also utilize the location of the largest magnitude equalizer coefficient to provide timing adjustment. In U.S. Pat. No. 4,334,313, the coefficient tracking approach does not use a center coefficient; instead, the coefficient queue is divided into two portions—a front and back portion. During each symbol interval, the location of the coefficient having the largest magnitude is referred to as the "reference" coefficient. If the reference coefficient is found to be located in the front of the queue, a "retard" signal is generated. Otherwise, an "advance" signal is generated. An advance timing adjustment is performed only when the number of advance signals generated since the last timing adjustment exceeds the number of retard signals by certain amount. Similarly, a retard timing adjustment is performed only when the number of retard signals generated since the last timing adjustment exceeds the number of advance signals by certain amount. This approach is advantageous because the timing adjustment is small, therefore minimizing the possibility of an over-correction. Moreover, this method prevents any rapid timing adjustment when the reference coefficient is alternating rapidly between the front and back portions of the queue.

In U.S. Pat. No. 4,411,000, instead of having a fixed step of timing adjustment as taught by Gitlin et al., the step size of the timing adjustment varies with the location of the reference (largest) coefficient. In U.S. Pat. No. 4,411,000, the distance of the reference (i.e. largest) coefficient from a predetermined point (for example, center tap) in the coefficient queue determines the magnitude of the timing adjustment. In other words, the greater the distance, the larger the increment magnitude. The goal is to push the reference coefficient back toward the center.

U.S. Pat. No. 5,825,818 to Kaku et al. also uses a method for timing adjustment based on equalizer coefficients. After a received signal has been equalized through the adjustment of equalizer tap coefficients to eliminate distortion in the received signal, a tap-power detector is used to detect the resulting distribution of the equalizer tap coefficients, and to compute the power summations of the tap coefficients on the left and right sides of the center tap and calculate the tap-power difference between the left and right taps power summations. Then the tap coefficients on one side of the equalizer are weighted with a symbol "k" to push the reference coefficient back toward the center of the equalizer. The symbol "k" is used to compensate for an asymmetric distribution of tap coefficients, to make the distribution symmetric again.

In another example, European Patent 599311B1 discloses a time recovery technique which uses the time difference between two clock pulses, namely a receiver oscillator and a separate VCO, to select a set of pre-defined tap coefficients for the transversal filter.

Each of the above-noted patents utilize equalizer tap coefficients, after their adjustment during equalization, for purposes of timing recovery. Several patents teach methods comprising tracking shifts in the reference coefficient from the center position of the equalizer, and determining the appropriate timing adjustment based on the shifted location of the reference coefficient, with means to attempt to push the reference coefficient back to the center tap. However, such prior art timing recovery techniques do not provide as high of a resolution as might be desired. While such techniques produce a timing error whose units are in sampling intervals, or worse yet as a ±1, what is needed is a system that achieves a resolution less than the sampling interval, and preferably much less. A finer resolution is important to minimize jitter generation in the timing loop.

SUMMARY OF INVENTION

The present invention provides an apparatus and method for joint equalization and timing recovery for RZ signals. In particular, the present invention directly utilizes equalizer tap values and/or indices in determining the timing error (i.e., the phase offset from the ideal timing instant). According to the invention, the reference equalizer tap does not shift from the desired position; the equalizer is able to track the channel changes without repetitively changing the reference tap. The invention is based on the use of a local measure of group delay to track timing while the equalizer converges and adapts. The invention uses an equalizer to measure group delay and adjust timing based on that measured group delay, and does not require any complicated method of tracking a shifting reference tap and attempting to compensate for any asymmetry in the tap coefficient distribution by pushing the reference tap back toward the center of the equalizer. The present invention achieves near optimal equalization (either linear or decision feedback equalization) without the recourse of oversampling the data, while simultaneously achieving robust timing acquisition. The invention applies to return to zero, baseband modulation for wireline communications. The invention presumes a good (high SNR) communication channel (wireline application) but it is very resistant to timing jitter making it ideal for telephony applications.

A receiver according to the invention comprises:
- a sampler (eg. an ADC) for receiving and sampling a signal;
- an equalizer having an input connected to the output of the sampler for receiving and equalizing samples of the received signal and having a set reference tap;
- a timing error detector having an input connected to a plurality of taps of the equalizer including the reference tap, for measuring group delay and using the measured group delay to determine a timing error; and
- adjustment circuitry having an input connected to the output of the timing error detector for adjusting the samples being input into the equalizer based on the output of the timing error detector.

The equalization and timing error detection is preferably entirely in the digital domain. The equalizer is preferably a linear equalizer to ensure rapid convergence, although a decision feedback equalizer may be used. Because the timing error detector uses information already contained in the equalizer taps, the timing error detector design is simplified. The circuitry and method of the invention can be further simplified by using only information from the reference tap and the two adjacent taps rather than information from all of the equalizer taps. The measurements from the selected taps can also be biased to optimize equalizer performance according to the error observed at the equalizer output.

In one embodiment of the invention, the adjustment circuitry modifies the timing of the sampler based on the timing error detected by the timing error detector. A voltage controlled oscillator provides a reference clock frequency for the sampler. That reference frequency is modulated with the processed output of the timing error detector in order to fine-tune the clock frequency so as to offset the detected timing error. The modulator is preferably a single side band modulator, although any phase mixer or phase picker may be used instead, including a multiphase voltage controlled oscillator. Prior to being modulated, the output of the timing error detector is first processed by a numerically controlled oscillator; the numerically controlled oscillator comprises a phase accumulator for converting a frequency input into a phase at the output, and then the phase output is used as a pointer into a lookup table to generate an in-phase output and a quadrature output that are then passed through a digital-to-analog converter to the modulator. Filters can be installed between the timing error detector and the numerically controlled oscillator, and between the modulator and the sampler.

Another embodiment of the invention uses a fixed sampling clock. Rather than adjusting the timing of the sampler, the adjustment circuitry instead modifies the samples output by the sampler prior to their equalization, using an all-digital timing interpolator. A programmable interpolation filter between the sampler and the equalizer generates intermediate, interpolated samples between the actual samples output by the sampler. The adjustment circuitry selectively modifies the actual samples and interpolated samples output by the interpolation filter, according to the output of the timing error detector, prior to their input into the equalizer in order to offset the timing error.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
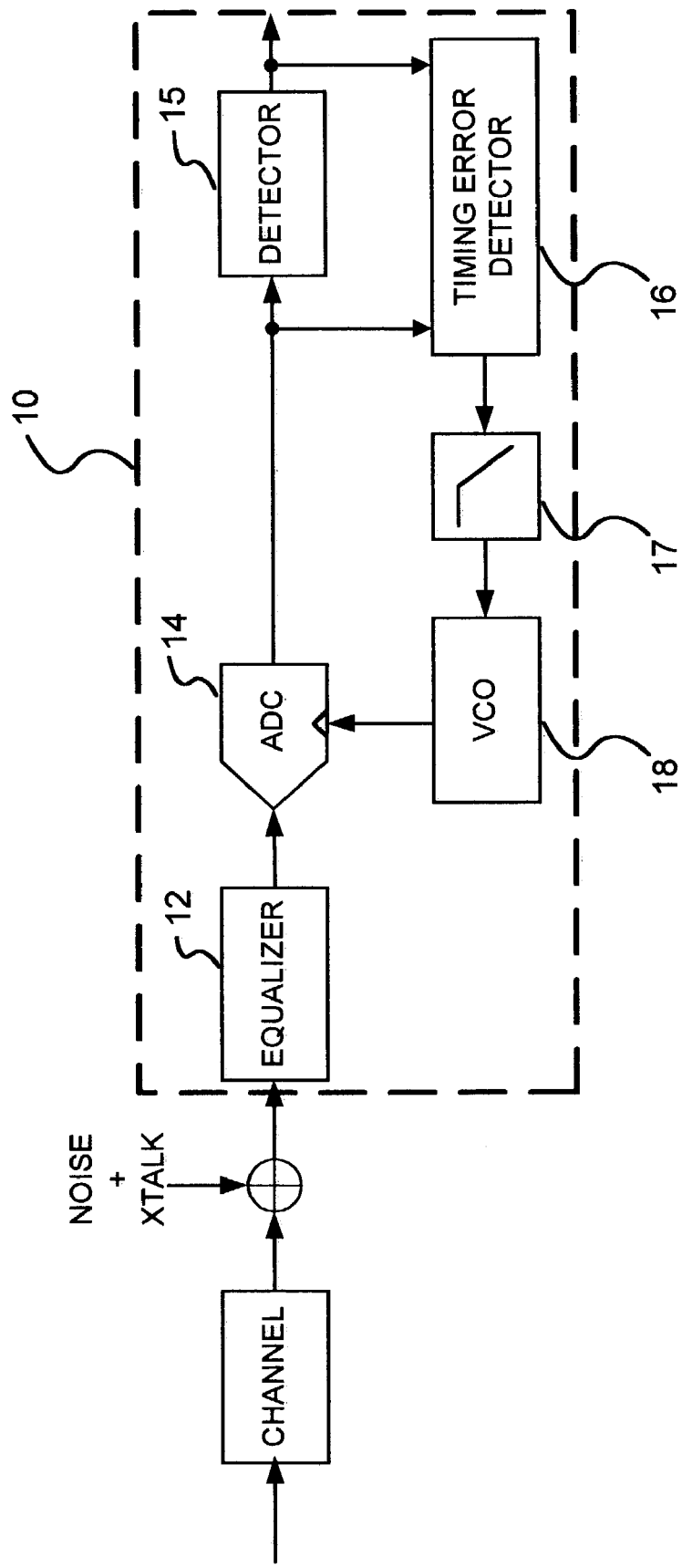
FIG. 1 is a schematic block diagram representation of a prior art receiver.
Figure 2:
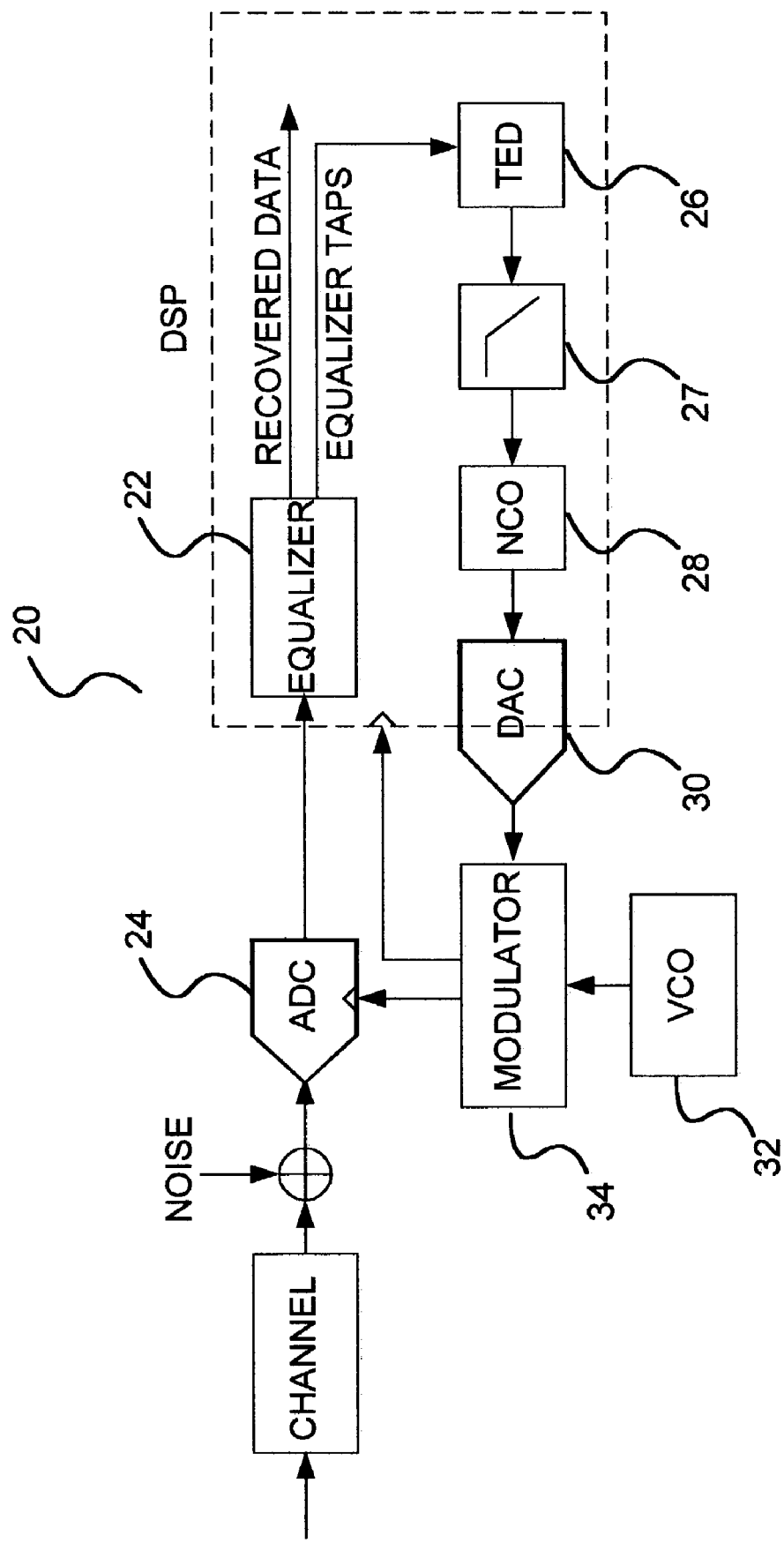
FIG. 2 is a schematic block diagram representation of a receiver according to a preferred embodiment of the present invention.

FIG. 2 illustrates a receiver 20 according to a preferred embodiment of the present invention. Unlike the prior art receiver 10 in FIG. 1, receiver 20 according to the present invention uses a timing recovery method which places an equalizer 22 inside the timing loop. In order to minimize area and power requirements, much of the circuitry of receiver 20 can be implemented in the digital domain. Referring to FIG. 2, equalizer 22 processes input data as sampled by a sampler in the form of an analog-to-digital converter (ADC) 24.

Equalizer 22 is capable of compensating for non-optimal symbol timing, albeit with a performance penalty, and hence the need for a timing recovery loop. Since the taps of equalizer 22 already contain information about the timing phase of the received signal, this invention advantageously uses equalizer tap values and/or their indices to aid in determining the timing error (i.e., the phase offset from the ideal timing instant). Timing error detector (TED) 26 calculates the timing offset from the equalizer taps.

Referring to FIG. 2, the output of TED 26 is low-pass filtered or integrated by filter 27, and then drives a numerically controlled oscillator (NCO) 28. NCO 28 outputs a digital sine wave, which is converted into an analog signal by a digital-to-analog converter (DAC) 30 and then mixed with the output of an analog voltage controlled oscillator (VCO) 32 by modulator 34, which is preferably a single sideband (SSB) modulator. VCO 32 runs at the nominal desired clock frequency; NCO 28, through use of modulator 34, is used to fine-tune the output clock in order to achieve phase lock.

In the preferred embodiment of the invention, modulator 34 is a SSB modulator, which provides the highest frequency resolution. However, instead of a SSB modulator, modulator 34 can be any phase mixer or phase picker, such as a traditional multiphase VCO.

As equalizer 22 is an integral part of the timing loop, a good design of equalizer 22 is very important to the performance of the timing recovery scheme. The invention includes a robust timing loop with preferably a symbol-spaced linear equalizer to ensure rapid convergence, although the invention is not limited to linear symbol-spaced equalizers and can also apply to decision feedback equalizers or fractionally-spaced equalizers.

The convergence of the timing loop is designed to be slower than that of equalizer 22. This advantageously allows the timing loop to average measurement jitter and input jitter. Equalizer 22 is trained with a fast convergence algorithm so it can track and adapt to high frequency input jitter.

In use, as illustrated in FIG. 2, input RZ signal data is sampled by ADC 24, ADC 24 is in turn timed by VCO 32, and VCO 32 is in turn controlled by the timing loop. The adaptation algorithm of equalizer 22 processes the input sampled data from ADC 24 and updates a set of tap values. The tap values are used by TED 26 whose output depends (as the tap values do) on recently received input data. TED 26 is used for advancing or retarding the timing through control of VCO 32 based on the measured group delay.

The operation of TED 26 is based on the reasonable assumption that there is a precise mapping between the equalizer group delay and timing error. This is a consequence of the ability of equalizer 22 to compensate for the phase (timing) offsets besides the main task of equalizer 22 to compensate for the channel distortion. The group delay measurement may be done on any frequency and it is not required that it be exact (in the sense of converging to an exact value) as long as it is repeatable and precise (in the sense that the dispersion of the measurements is low).

Figure 3:
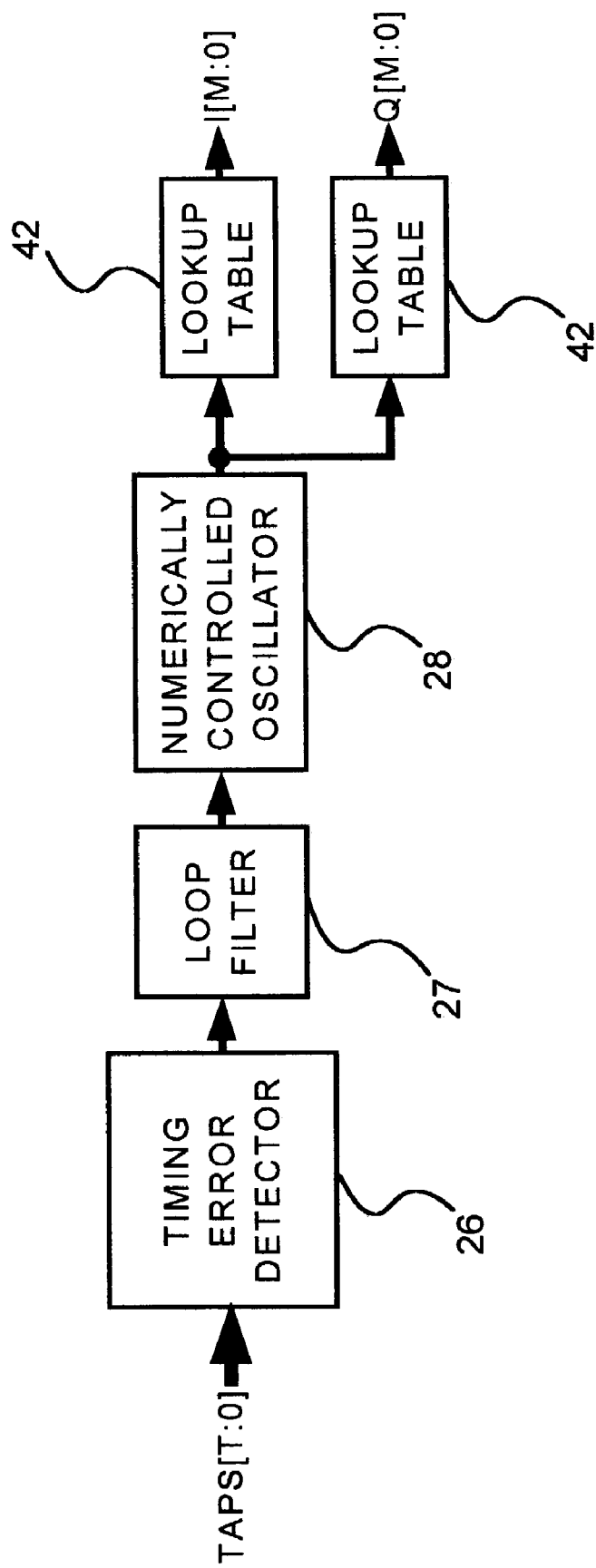
FIG. 3 is a schematic block diagram of the digital portion of the timing recovery circuitry of a receiver according to a preferred embodiment of the present invention.

The digital portion of the timing recovery loop is illustrated in greater detail in FIG. 3. It consists of three major blocks: TED 26, a loop filter 27, and NCO 28. The inputs to TED 26 are the equalizer tap values and/or their indices. The output of the circuit consists of in-phase and quadrature sinusoid signals I, Q.

Figure 4:
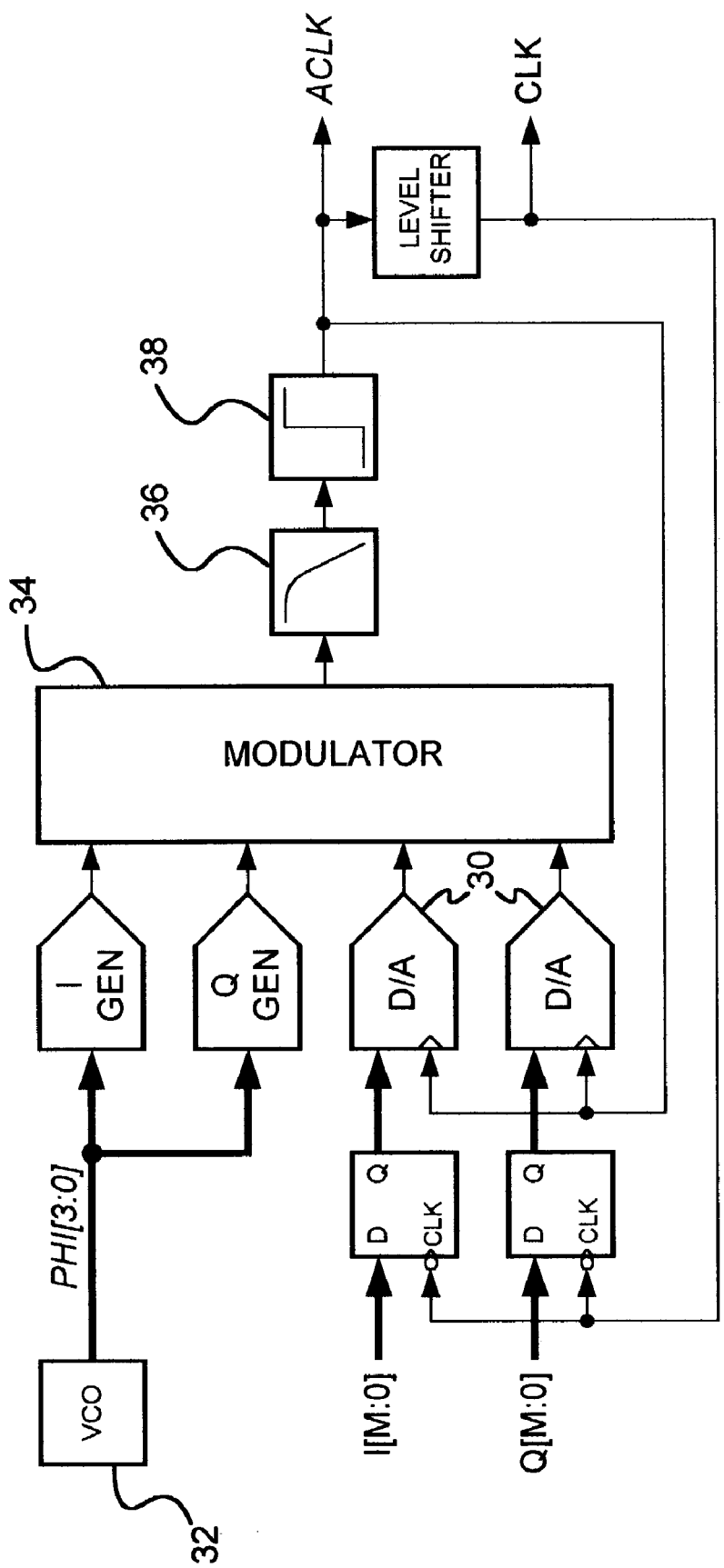
FIG. 4 is a schematic block diagram of the analog portion of the timing recovery circuitry of a receiver according to a preferred embodiment of the present invention.

FIG. 4 illustrates in greater detail the analog portion of the timing recovery loop. The analog portion of the timing recovery loop consists of a phase-locked loop represented in FIG. 4 by VCO 32, modulator 34, a filter 36, and a slicer 38. VCO 32 generates a reference frequency for modulator 34. Output signals I, Q generated by NCO 28 are passed to modulator 34. In this manner, the output of NCO 28 is used to fine-tune the output frequency of VCO 32, which runs at the nominal desired clock frequency. Slicer 38 is used to convert the resulting sinusoidal wave into a "clock" square wave.

Timing Error Detector

TED 26 in this invention uses equalizer tap information (values and/or indices) to determine the phase offset from the optimum sampling clock phase. Equalizer tap information is used for two main reasons: (1) since equalizer 22 is able to compensate for timing offsets, the taps already contain information about the timing offset (this allows TED 26 to be simplified), and (2) since equalizer 22 is of limited size (i.e., a limited number of taps), it is necessary to ensure that the equalizer taps stay within their useable range. Equalizer 22 is initialized to a location of the reference tap that maximizes typical performance. Note the location of the reference tap is unlikely to be the middle tap of equalizer 22. A possible set of seven initial taps could be [0 0 1 0 0 0 0]. This initial tap configuration is based on the particular channel characteristics. In DS3 systems, the ideal equalizer group delay that maximizes the equalizer performance has been found to be near a sample off. However, if the invention is used in other applications, a different value may be more suitable as an initial guess. This configuration is only an example but illustrates an equalizer 22 that is likely to require trailing tap values. This invention does not require that the distribution of tap values be symmetric, and the reference tap does not shift during equalization.

Three Tap Group Delay TED

The reference tap location for the equalizer initialization improves the description of the channel compensation as represented by the values of the taps. However, small changes of the timing of the input data—smaller than a sample interval—can affect the performance of the equalizer by several dB. Thus, it is necessary to measure timing with sufficient resolution to optimize performance. A measurement of the timing can be obtained by computing a theoretical group delay analysis of the equalizer taps. The group delay can then be used for tracking timing. Group delay measurements are very sensitive to noise in the tap values and cannot be used reliably. A simple technique that gives good performance is to use only the center three taps, namely, the reference tap and its adjacent taps on either side. The technique works well for an equalizer with a dominant tap value.

The transfer function of the three tap equalizer is formulated in equation [1], where x, y, and z are the equalizer tap values, ω is the frequency (in radians/s) and T is the sampling period:

$$H(e^{j\omega}) = x e^{-j\omega T} + y + z e^{j\omega T} \qquad [1]$$

The group delay function of $H(e^{j\omega})$ can be obtained by equation [2]:

$$\text{group\_delay} = -\frac{d}{dw}\{\arg[H(e^{jw})]\} \qquad [2]$$

To simplify the equation, the group delay equation is solved for ω=0. The result is shown in equation [3]:

$$\text{Three\_tap\_group\_delay} = \frac{z - x}{x + y + z} \qquad [3]$$

The denominator in equation [3] reflects the DC gain of a three-tap filter. In the preferred embodiment of the present invention, input gain control is used to optimize the dynamic range of ADC 24. This means that the DC gain is controlled to be near unity and the denominator can be ignored. If the gain is not controlled, a suitable approximation to the division can be performed as only three or four significant bits are required to provide adequate resolution.

Biasing the group delay measurement allows a timing phase to be chosen that optimizes the performance of equalizer 22. Equation [4] formulates one simple example formulation for biasing. Biasing implies the following:

$$\text{Biased\_three\_tap\_group\_delay} = az - bx \qquad [4]$$

where a+b=2. By monitoring performance (error at the output of equalizer 22), the values of a and b can be used to optimize equalizer 22. The biasing could be optimized once during installation or it can be made adaptive by measuring the equalizer error and perturbing a and b to minimize this error. This biasing is desirable because the optimal position for the group delay measurement usually falls between the main equalizer tap and one of the adjacent leading or lagging taps (depending on the channel). In other words, it is very unlikely that it will fall on the position of the main tap.

Lead-Lag Loop Filter and Loop Gain

Since equalizer 22 is coupled to TED 26, it is also necessary to ensure that equalizer 22 and the remainder of the timing recovery loop do not compete during the timing acquisition. In the preferred embodiment of the invention, this is achieved by using as small a loop gain as possible. A small timing loop gain ensures that the timing loop does not interfere with the training of equalizer 22. The lead lag filter changes the phase of the feedback signal to improve performance.

Numerically Controlled Oscillator

Figure 5:
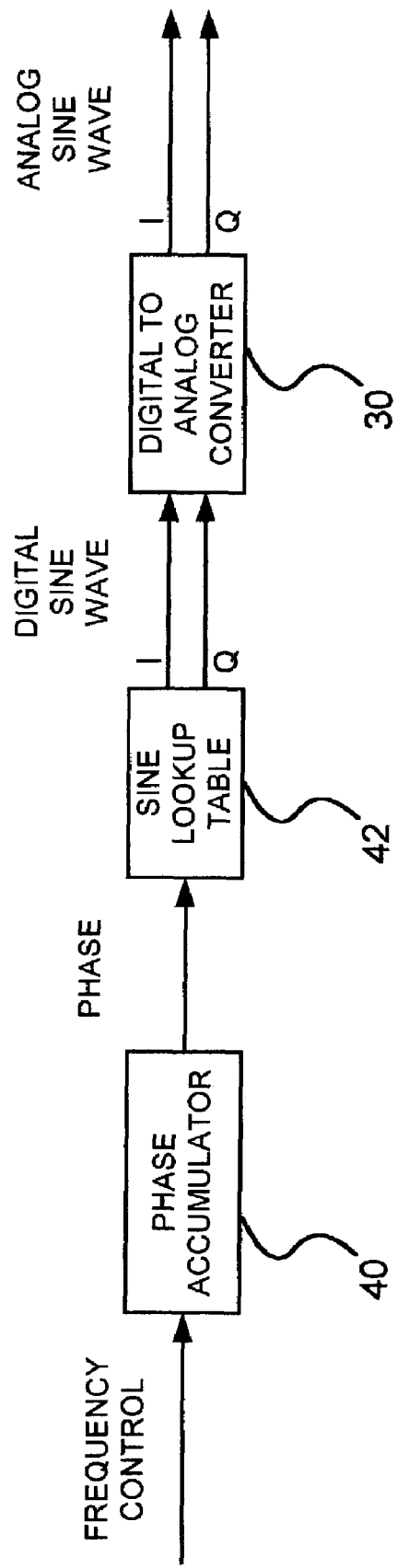
FIG. 5 is a schematic block diagram of the numerically controlled oscillator and the digital-to-analog converter illustrated in FIG. 2.

FIG. 5 is a schematic block diagram of NCO 28 and DAC 30. As shown in FIG. 5, the operation of NCO 28 and DAC 30 is composed of three blocks: a phase accumulator 40, a lookup table 42, and DAC 30. The input to NCO 28 is the low-pass filtered output of TED 26 and filter 27, and represents a frequency control word.

Phase accumulator 40 is a discrete time integrator that converts the frequency input to a phase at the output. This phase is used as a pointer into lookup table 42, which generates in-phase output I and quadrature output Q. When in lock, the frequency control signal ideally will be zero, which will result in a constant (DC) value at the output of NCO 28. A positive input word will result in an output with "positive" frequency where the output Q leads the output I, and a negative input word will result in a "negative" frequency output where the output Q will lag the output I.

Figure 6:
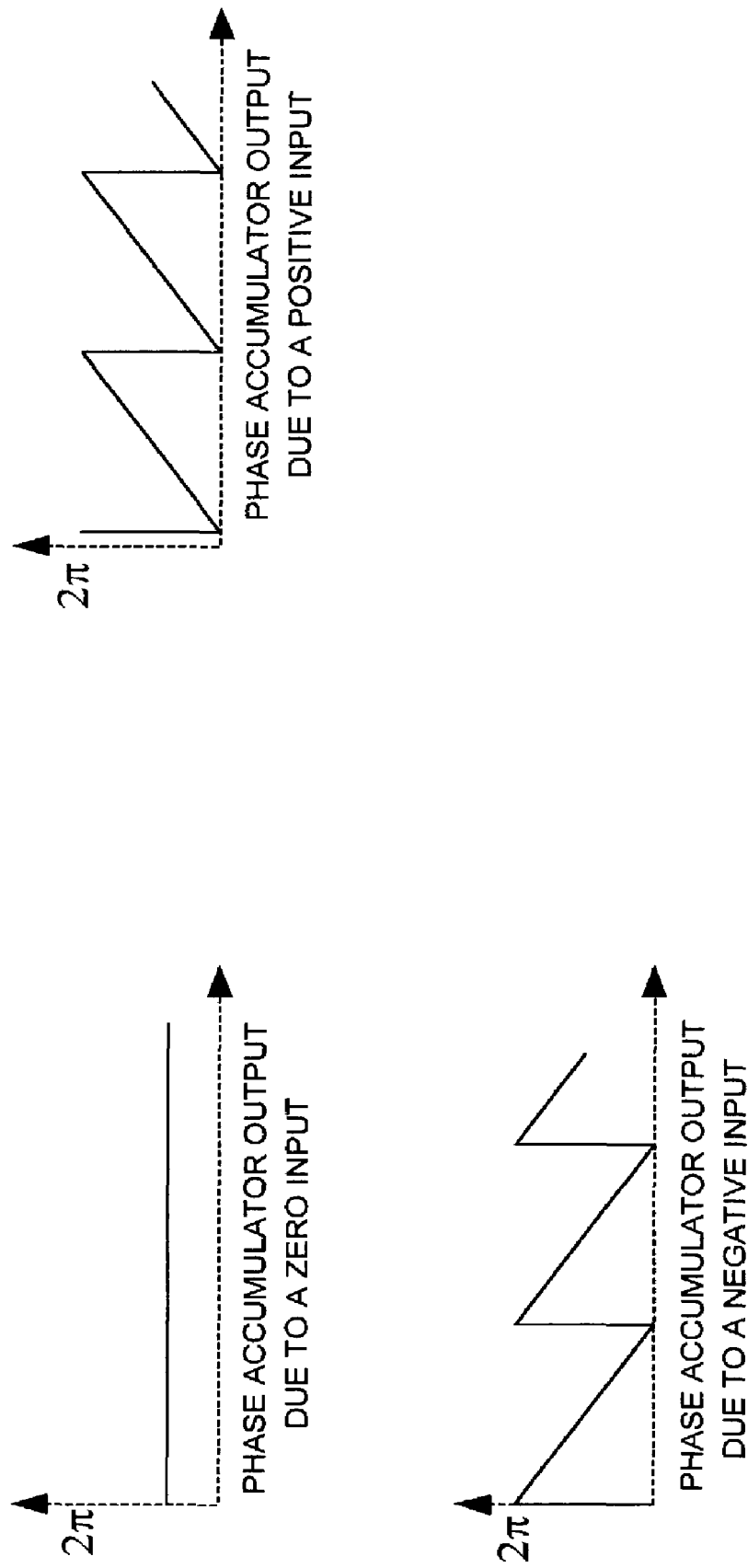
FIG. 6 graphically depicts the output of the phase accumulator illustrated in FIG. 5.

FIG. 6 is a graphical illustration of this behavior. At the output of modulator 34, the frequency of the NCO signal is either added to or subtracted from the frequency of VCO 32, depending on whether the NCO 28 is outputting a "positive" or "negative" frequency, respectively. Hence, NCO 28 is used to fine-tune the frequency of VCO 32.

The range of output frequencies, and hence the tuning range of the timing recovery circuit as a whole is determined by the number of bits in phase accumulator 40.

The present invention improves upon the prior art described above in terms of equalizer convergence speed, timing acquisition speed, and in robustness with respect to input timing jitter. Although other patents may use an equalizer as the source of timing adjustment, none of them use the group delay measurement of the present invention for timing error detection; instead, they all used some ad hoc approaches, usually relating to tracking and compensating for a shifting reference tap coefficient. In the present invention, the reference tap does not shift, and the use of equalizer 22 to extract timing allows the invention to track fairly high frequency jitter. The invention is highly tolerant of input jitter, even high frequency jitter, while TED 26 generates very little jitter itself. TED 26 provides a resolution of ⅛, a significant improvement over the timing error resolution of prior art timing recovery techniques, where timing errors are in units of sampling intervals or worse yet as a ±1. This resolution is important to minimize jitter generation in the timing loop. Further, the use of a biasing technique in TED 26 allows the invention to optimize the performance of equalizer 22 without the burden of oversampling.

The adjustment circuitry of this invention need not be confined to adjusting the timing of the sampler, in this case ADC 24. As can be appreciated by those skilled in the art, there are other ways to adjust the sampled data to offset a timing error prior to inputting those samples into equalizer 22. For example, one may alternative use an all-digital timing interpolator and a fixed sampling clock, and a programmable interpolation filter that generates intermediate, interpolated samples between the actual samples produced by ADC 24. Adjustment circuitry adjusts timing to offset the detected timing error by selectively modifying the input sampled data, both actual and interpolated samples, prior to their input into equalizer 22.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A receiver for use in a data communication system, the receiver comprising:
   (a) a sampler for receiving and sampling a signal;
   (b) an equalizer having an input connected to the output of the sampler for receiving and equalizing samples of the received signal and having a set reference tap;
   (c) a timing error detector having an input connected to a plurality of taps of the equalizer including the reference tap, for measuring group delay and using the measured group delay to determine a timing error; and
   (d) adjustment circuitry having an input connected to the output of the timing error detector, wherein the adjustment circuitry adjusts the samples being input into the equalizer based on the output of the timing error detector.

2. A receiver as claimed in claim 1, wherein said equalizer is a linear equalizer.

3. A receiver as claimed in claim 1, wherein said equalizer is a decision feedback equalizer.

4. A receiver as claimed in claim 1, wherein the timing error detector extracts information from the reference tap and adjacent taps on each side of the reference tap.

5. A receiver as claimed in claim 1, wherein the timing error detector has biasing means for differentially weighting information from different equalizer taps.

6. A receiver as claimed in claim 1, wherein the sampler is an analog-to-digital converter.

7. A receiver as claimed in claim 1 further comprising a voltage controlled oscillator for providing a reference clock frequency for the sampler, and wherein the adjustment circuitry comprises a modulator for modulating the reference clock frequency with the output from the timing error detector to adjust the timing of the sampler to offset the detected timing error.

8. A receiver as claimed in claim 7, wherein said modulator is a phase mixer.

9. A receiver as claimed in claim 7, wherein said modulator is a single sideband modulator.

10. A receiver as claimed in claim 7, wherein said modulator is a phase picker.

11. A receiver as claimed in claim 7, wherein said modulator is a multiphase voltage controlled oscillator.

12. A receiver as claimed in claim 7, further comprising a filter connected between the modulator and the sampler so that the timing of the sampler is adjusted by the filtered output of the modulator.

13. A receiver as claimed in claim 7, wherein the sampler is an analog-to-digital converter, and wherein the adjustment circuitry further comprises a digital-to-analog converter for converting the output of the timing error detector for modulation with the reference clock frequency so as to adjust the timing of the analog-to-digital converter to offset the detected timing error.

14. A receiver as claimed in claim 13, wherein the adjustment circuitry further comprises a numerically controlled oscillator for processing the output from the timing error detector and then passing the processed output to the input of the digital-to-analog converter.

15. A receiver as claimed in claim 14, wherein the numerically controlled oscillator comprises:
   (a) a phase accumulator for converting a frequency input into a phase at the phase accumulator output; and
   (b) a lookup table,
   wherein the phase output by the phase accumulator comprises a pointer into the lookup table to an in-phase output and a quadrature output passable by the numerically controlled oscillator to the input of the digital-to-analog converter.

16. A receiver as claimed in claim 14, further comprising a loop filter connected between the timing error detector and the numerically controlled oscillator so that the numerically controlled oscillator is driven by the filtered output of the timing error detector.

17. A receiver as claimed in claim 6, wherein the adjustment circuitry comprises a digital timing interpolator having a programmable interpolation filter connected between the analog-to-digital converter and the equalizer for generating intermediate, interpolated samples between the samples actually output by the analog-to-digital converter, and wherein the adjustment circuitry selects among the actual and interpolated samples for input to the equalizer according to the output of the timing error detector.

18. A method of jointly equalizing a received signal and detecting timing errors in the received signal, comprising:
   (a) receiving and sampling a signal;
   (b) equalizing samples of the received signal;
   (c) detecting a timing error based on a group delay measured from information from a plurality of equalizer taps, including a set reference tap; and
   (d) adjusting the samples before equalization based on the detected timing error.

19. The method claimed in claim 18, wherein the equalization is a blind linear equalization.

20. The method claimed in claim 18, wherein the equalization is a decision feedback equalization.

21. The method claimed in claim 18, wherein only information from the reference tap and adjacent taps on each side of the reference tap is used to detect the timing error.

22. The method as claimed in claim 18, further comprising a biasing step wherein information from different equalizer taps is differentially weighted.

23. The method as claimed in claim 18, wherein the adjustment step comprises:
   (a) converting the timing error output by the timing error detector from a frequency to a phase output;
   (b) using the phase output as a pointer into a lookup table to generate an in-phase output and a quadrature output;

(c) modulating the in-phase output and the quadrature output with a reference clock frequency; and
(d) using the modulated output to adjust the timing of the sampling.

24. The method as claimed in claim 18, further comprising, prior to equalization, generating intermediate, interpolated samples between the actual samples, and wherein the adjustment circuitry selects among the actual and interpolated samples for input to the equalizer according to the output of the timing error detector.

* * * * *